US007911728B2

(12) United States Patent
Albrecht et al.

(10) Patent No.: US 7,911,728 B2
(45) Date of Patent: Mar. 22, 2011

(54) METHOD FOR SERVOWRITING A PATTERNED-MEDIA PERPENDICULAR MAGNETIC RECORDING DISK USING POSITION ERROR SIGNAL (PES) ALIGNMENT FIELDS

(75) Inventors: Thomas R. Albrecht, San Jose, CA (US); Zvonimir Z. Bandic, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 287 days.

(21) Appl. No.: 12/324,431

(22) Filed: Nov. 26, 2008

(65) Prior Publication Data
US 2010/0128583 A1 May 27, 2010

(51) Int. Cl.
G11B 21/02 (2006.01)
G11B 5/09 (2006.01)
(52) U.S. Cl. ............................................ 360/75; 360/48
(58) Field of Classification Search .......................... None
See application file for complete search history.

(56) References Cited

U.S. PATENT DOCUMENTS

| | | | |
|---|---|---|---|
| 6,751,035 B1 | 6/2004 | Belser | |
| 6,754,032 B1 | 6/2004 | Szita et al. | |
| 7,009,791 B2 * | 3/2006 | Shimatani | 360/29 |
| 7,236,325 B2 | 6/2007 | Albrecht et al. | |
| 7,324,294 B2 * | 1/2008 | Moser | 360/51 |
| 7,347,953 B2 | 3/2008 | Black et al. | |
| 7,643,234 B2 * | 1/2010 | Albrecht et al. | 360/48 |
| 7,729,074 B2 * | 6/2010 | Venkataramani et al. | 360/51 |
| 7,782,561 B2 * | 8/2010 | Albrecht et al. | 360/48 |

OTHER PUBLICATIONS

Terris et al., "Topical Review: Nanofabricated and self-assembled magnetic structures as data storage media", J. Phys. D: Appl. Phys. 38 (2005) R199-R222.
Kim et al., "Rapid Directed Self-Assembly of Lamellar Microdomains from a Block Copoloymer Containing Hybrid", Proc. of SPIE vol. 6921, 692129, (2008).

* cited by examiner

*Primary Examiner* — K. Wong
(74) *Attorney, Agent, or Firm* — Thomas R. Berthold (57) ABSTRACT

A servowriting method for a patterned-media magnetic recording disk uses a special position error signal (PES) alignment pattern located in each servo sector. A gross feedforward correction signal to compensate for gross eccentricity of the disk relative to the center of rotation of the servowriter spindle is applied to the actuator. With the gross feedforward correction applied to the actuator the read head generally follows a data track centerline and will detect signals from PES alignment fields as each servo sector passes the read head. This results in a readback signal at each servo sector that represents the fractional track-width radial offset of the read head in that servo sector from a data track centerline. The set of radial offsets for all of the servo sectors is used to modify or fine tune the gross feedforward correction signal that is applied during the servowrite process. This enables the servowriter write head to then precisely follow a track centerline so that the discrete islands in the PES fields can be magnetized according to the desired pattern.

18 Claims, 6 Drawing Sheets

METHOD FOR SERVOWRITING A PATTERNED-MEDIA PERPENDICULAR MAGNETIC RECORDING DISK USING POSITION ERROR SIGNAL (PES) ALIGNMENT FIELDS

BACKGROUND OF THE INVENTION

1. Field of the Invention

This invention relates generally to patterned-media magnetic recording disks that have data tracks with discrete magnetizable data islands and servo sectors that extend across the tracks and have discrete magnetized islands used for head-positioning, and more particularly to a method for servowriting or magnetizing the islands in the servo sectors.

2. Description of the Related Art

Magnetic recording hard disk drives with patterned magnetic recording media have been proposed to increase the data density. In patterned media, the magnetic recording layer on the disk is patterned into small isolated data islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. Alternatively, the patterned media may be fabricated so that that there is no magnetic material in the spaces between the islands.

Like conventional non-patterned or continuous-media disks, patterned-media disks also have nondata servo sectors that are used for read/write head positioning. The nondata servo sectors in patterned-media disks contain discrete islands separated by nonmagnetic spaces. The servo islands are patterned into a position error signal (PES) field that generates a servo readback signal that is demodulated into a PES for positioning the read/write head to the desired data track and maintaining it on track.

Several techniques have been proposed for fabricating patterned-media disks, including conventional lithography, direct-write electron-beam (e-beam) lithography, nanoimprinting, and guided self-assembly. These techniques are described in numerous references, including Terris et al., "TOPICAL REVIEW: Nanofabricated and self-assembled magnetic structures as data storage media", *J. Phys. D: Appl. Phys.* 38 (2005) R199-R222. In nanoimprinting, a master template is fabricated, typically by direct e-beam writing, to have the desired pattern of discrete islands. The master template is pressed against a resist film on the disk substrate and subsequent etching steps of the substrate result in a patterned disk substrate onto which the magnetic layer is deposited. In guided self-assembly, a substrate is topographically patterned or the substrate surface is selectively chemically modified so that nanostructures can form in some areas and not others. Self-assembling block copolymers have been proposed for creating periodic nanometer-scale features that can be used to form the discrete islands. In guided self-assembly, the resulting discrete islands are typically formed as a hexagonal-close-packed (HCP) array. There are numerous references describing self-assembling block copolymers, including U.S. Pat. No. 7,347,953 B2 and Kim et al., "Rapid Directed Self-Assembly of Lamellar Microdomains from a Block Copolymer Containing Hybrid", *Proc. of SPIE* Vol. 6921, 692129, (2008).

Patterned-media disks, especially those with self-assembled HCP arrays of discrete islands, present a unique problem in servowriting. Because the discrete islands are formed during a separate disk fabrication process, when the disks are mounted on the rotatable spindle of the servowriter (or the spindle of the disk drive if servowriting is done in the drive) the concentric data tracks can never be perfectly aligned with the center of rotation of the spindle. Also, the disk fabrication process may itself result in the data tracks not being perfectly concentric. Thus if the disk is rotated with the servowriter write head held at a fixed radial position from the center of rotation, the write head will typically traverse multiple tracks as the servo sectors pass the head during one disk rotation. This makes it impossible during the servowriting process for the head to magnetize the islands in the servo sectors according to the desired pattern.

What is needed is a method for servowriting patterned-media magnetic recording disks that have discrete magnetizable islands in the servo sectors that must be magnetized according to a desired pattern.

SUMMARY OF THE INVENTION

In the servowriting method according to this invention, all of the discrete islands or "dots" in the data sectors and servo sectors of the patterned-media disk are first magnetized in the same direction, typically by a DC magnetization process. The gross eccentricity or non-circularity of the tracks on the disk with respect to the center of rotation is then calculated and used to generate a gross feedforward correction or compensation signal. In one method of doing this, the read head is held at a fixed radial position, the disk is rotated, and data track crossings are detected as a function of angular position, which can be used to calculate the gross eccentricity or non-circularity of the disk. The gross feedforward correction signal to the actuator causes the servowriter read head to follow a data track centerline within one track.

A special PES alignment pattern is located in each servo sector and is used to generate a fine correction signal to precisely adjust the radial position of the servowriter write head relative to a data track centerline. The special PES alignment pattern can be DC magnetized and used to generate a bootstrap servo signal that is then used to write the PES pattern. The PES alignment pattern comprises multiple circumferentially spaced-apart alignment fields. Each alignment field comprises a plurality of circumferential segments that are radially spaced apart, typically by the track width or track pitch (TP). With the gross feedforward correction applied to the actuator and the read head thus generally following a data track centerline, the read head will cross the circumferential segments in the PES alignment fields as each servo sector passes the read head. This results in a readback signal at each servo sector that represents the fractional track-width radial offset of the read head in that servo sector, i.e., the fractional amount of a track-width the read head is radially offset from a data track centerline. The set of radial offsets for all of the servo sectors represents the fine eccentricity or non-circularity of the tracks on the disk with respect to the center of rotation of the spindle. This data is used to modify or fine tune the gross feedforward correction signal that is applied during the servowrite process. This enables the write head to then precisely follow a track centerline (or a track radially shifted from the track centerline by a fraction of TP) so that the dots in the PES fields can be magnetized according to the desired pattern.

The invention also relates to a patterned-media magnetic recording disk that contains the PES alignment fields within the servo sectors.

For a fuller understanding of the nature and advantages of the present invention, reference should be made to the following detailed description taken together with the accompanying figures.

DETAILED DESCRIPTION OF THE INVENTION

Figure 1:
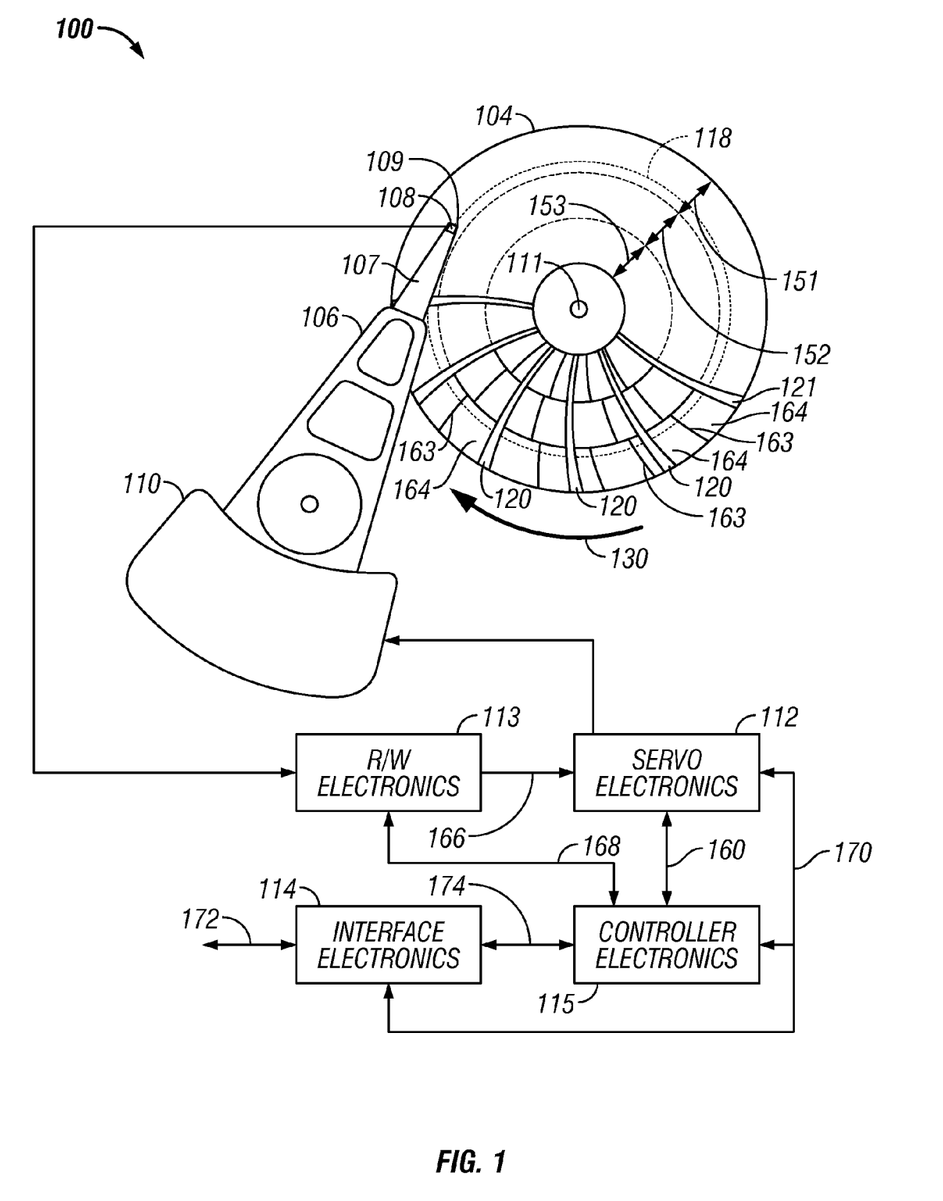
FIG. 1 is a block diagram of a disk drive system with a patterned-media disk.

FIG. 1 is a schematic of a magnetic disk drive system 100. Disk drive system 100 includes a magnetic recording disk 104, a voice coil motor (VCM) actuator 110, an actuator arm 106, a suspension 107, a slider 108, and a read/write head 109. Read/write head 109 is typically a combination of an inductive write head and a magnetoresistive read head that is located on the trailing end or end face of slider 108. Slider 108 is supported on the actuator arm 106 by a suspension 107 that enables the slider to "pitch" and "roll" on an air-bearing generated by the disk 104 as it rotates in the direction of arrow 130. Only one disk surface with an associated slider and read/write head is shown in FIG. 1, but there are typically multiple disks stacked on a hub that is rotated by a spindle motor, with a separate slider and read/write head associated with each surface of each disk.

Disk 104 is mounted on a spindle motor (not shown) that has a center of rotation 111 and is rotated in direction 130. Disk 104 has a magnetic recording layer with radially-spaced concentric data tracks, one of which is shown as track 118. Each data track has a reference index 121 indicating the start-of-track. Disk drive system 100 is illustrated as a zone-bit-recording (ZBR) disk drive because the data tracks are grouped radially into a number of annular data bands or zones, three of which are shown as zones 151, 152, and 153, but the invention is fully applicable to a disk drive that does not use ZBR, in which case disk drive system 100 would have only a single data zone. Within each zone, the tracks are also circumferentially divided into a number of data sectors, such as typical data sectors 164 in the radially outer data zone. Each data sector 164 is preceded by a synchronization (sync) field, such as typical sync fields 163. The sync fields 163 are detectable by the read/write head 109 for enabling synchronization of reading and writing the data bits in the data sectors 164. In conventional disk drives, a sync field is a non-data region on the disk that is magnetized each time data is written in its associated data sector.

Each data track also includes a plurality of circumferentially or angularly-spaced servo sectors 120. The servo sectors include servo information, including position error signal (PES) fields, detectable by the read/write head 109. The servo information is used by the servo electronics 112 for moving the read/write head 109 to desired data tracks and maintaining the read/write head 109 on the data tracks. The servo sectors 120 in each track are aligned circumferentially with the servo sectors 120 in the other tracks so that they extend across the tracks in a generally radial direction, as represented by radially-directed servo sectors 120. The servo sectors 120 are non-data regions on the disk that are magnetized once in a servo writing process typically during manufacturing or formatting of the disk 104, and are not intended to be erased during normal operation of disk drive system 100.

The electronics associated with disk drive system 100 include read/write (R/W) electronics 113, servo electronics 112, controller electronics 115, and interface electronics 114. In the operation of disk drive system 100, the R/W electronics 113 receive signals from read/write head 109 and passes servo information from the servo sectors 120 to servo electronics 112 and data signals from the data sectors 164 to controller electronics 115. Servo electronics 112, which typically includes a servo control processor or microprocessor and associated memory, decodes the servo information from the PES fields and generates a current that drives VCM actuator 110 to position read/write head 109. Interface electronics 114 communicates with a host system (not shown) over interface 172, passing data and command information. Interface electronics 114 also communicates with controller electronics 115 over interface 174. In the operation of disk drive system 100, interface electronics 114 receives a request for reading from or writing to the data sectors 164 over interface 172. Controller electronics 115 receives a list of requested data sectors from interface electronics 114 and converts them into a set of numbers that uniquely identify the disk surface, track, and data sector. The numbers are passed to servo electronics 112 to enable positioning read/write head 109 to the appropriate data sector.

Conventional magnetic disk drive systems use disks with "continuous" media, meaning that the magnetic recording layer is a continuous film of magnetizable material. In conventional continuous-media disks, the concentric data tracks are not physically separated from one another and are not pre-formed in the recording layer, but are formed when the write fields from the read/write head 109 create the magnetizations in the continuous magnetic layer. However, magnetic recording disks with "patterned" media have been proposed to increase the data density. In patterned media, the magnetizable material on the disk is patterned into small discrete islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. To produce the required magnetic isolation of the patterned islands, the magnetic moment of the spaces between the islands is destroyed or substantially reduced so as to render these spaces essentially nonmagnetic.

Figure 2:
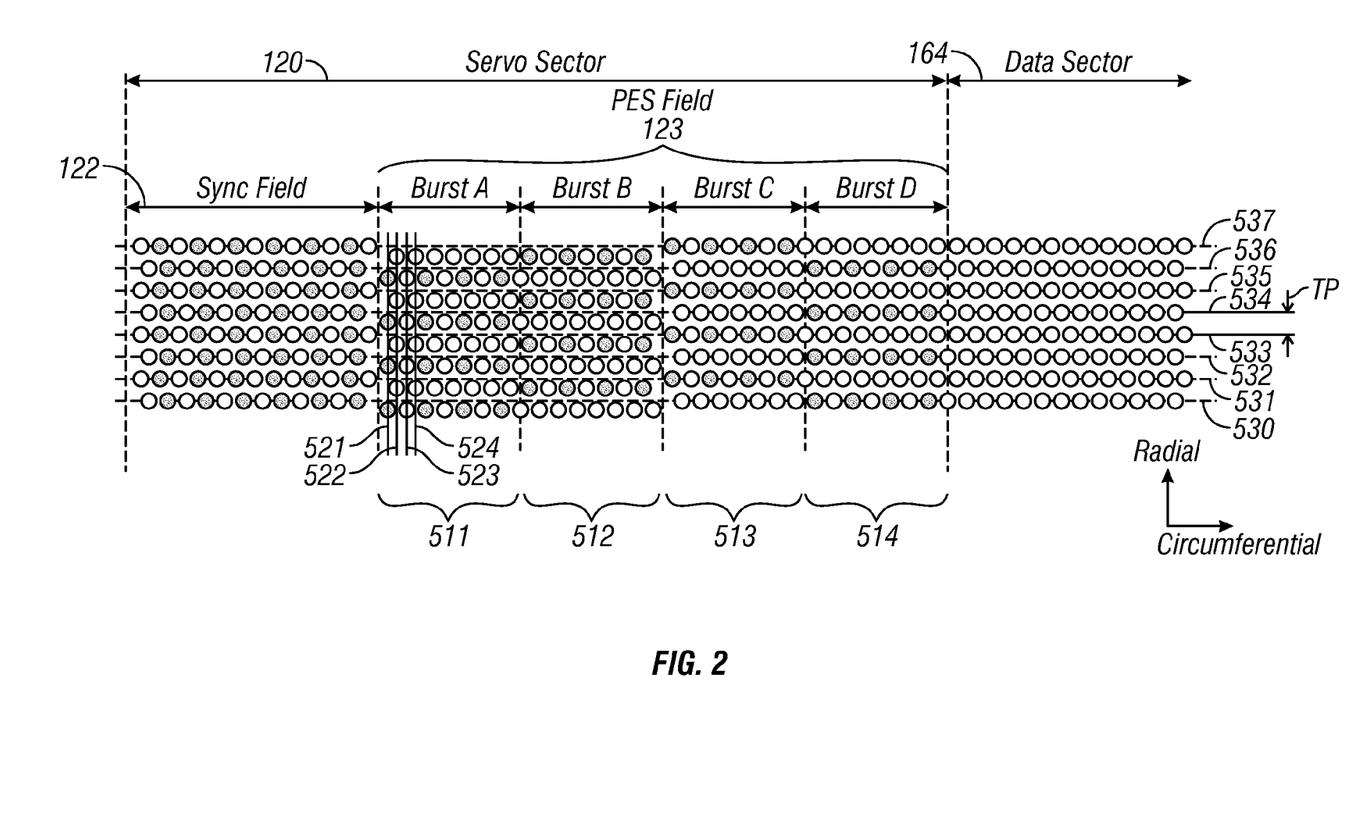
FIG. 2 is an illustration of a portion of a patterned-media disk showing a data sector and a servo sector with a position error signal (PES) field with discrete dots formed by self-assembly as a hexagonal-close-packed (HCP) array.

Thus, in the disk drive system 100 described above the disk 104 may be a "patterned-media" disk with data tracks, like track 118, that contain discrete data islands. FIG. 2 illustrates exemplary patterns of a servo sector 120 and a data sector 164 for a patterned-media disk with discrete islands. The discrete islands are formed by self-assembly and thus form a hexagonal-close-packed (HCP) array of discrete "dots" of magnetizable material. The horizontal dotted lines 531-537 in FIG. 2 illustrate the centerlines of tracks of magnetic recording disk 104. The shaded dots in FIG. 2 represent one polarity of perpendicular magnetization (into or out of the page in FIG. 2), while the white dots represent the opposite polarity. The dots in data sector 164 represent actual user data and will thus have a complex magnetization pattern utilizing both polarities. Servo sector 120 includes a synchronization (sync) field 122 and a PES field 123 that may include burst fields (A-D), represented as fields 511-514. The dots in fields A-B are shown as being radially shifted by one-half track from the dots in fields C-D. As the read/write head 109 on slider 108 (see FIG. 1) traverses the PES field 123, the amplitude of the various bursts A through D will vary in amplitude, depending on the radial position of the center of read/write head 109 with respect to the centerline of the track.

The dots in servo sector 120 in FIG. 2 are illustrated as hexagonal-close-packed (HCP) arrays of rows of dots that are highly ordered as a result of self-assembly. The HCP ordering of the arrays of dots creates a plurality of radial columns of dots. Vertical lines 521-524 illustrate four radial columns of dots in field 511. Because of the HCP ordering, the radial columns are formed from dots in alternating rows. In other words, the radial columns are not formed from dots in consecutive rows due to the HCP ordering, but are formed from dots in every other row. FIG. 2 illustrates a very small portion of the disk and thus illustrates the HCP ordering of the dots on a local scale. However, the dots are not HCP ordered on the scale of the whole disk. The HCP pattern is "wrapped around" circular tracks, which results in the HCP pattern being slightly compressed in the circumferential direction at the inside diameter (ID) of any given zone, and slightly expanded in the circumferential direction at the outside diameter (OD) of any given zone. However, in any particular servo sector over a relatively small radial portion of a zone, the pattern of dots in the PES fields and in the subsequently described PES alignment fields may be considered as an HCP pattern.

As a result of the servowriting process, the dots of a first radial column 521 have a first polarity (indicated by black dots), and the dots of the next three radial columns 522-524 have a second polarity (indicated by white dots). This pattern in the successive radial columns is repeated in burst fields A-D (i.e., from left to right in FIG. 2). The terms "first" and "second" polarity are used to describe opposite or antiparallel polarities. For example, in perpendicular recording, a first polarity may refer to an dot having a magnetization pointing out of the page in FIG. 2. A second polarity may refer to an dot having a magnetization pointing into the page in FIG. 2.

The servowriting of the dots to have the desired pattern of magnetization, like the typical pattern of PES field 123 shown in FIG. 2, may be performed in the disk drive system 100 using the read/write head 109. More typically, however, the servowriting is performed in a separate dedicated servowriter that also has a read head, a write head and an actuator for moving the heads to the desired tracks. Patterned-media disks, especially those with self-assembled HCP arrays of discrete dots, present a unique problem in servowriting. Because the discrete dots are formed during a separate disk fabrication process, when the disks are mounted on the rotatable spindle of the servowriter (or the spindle of the disk drive if servowriting is done in the drive) the concentric tracks 530-537 can never be perfectly aligned with the center of rotation 111 (FIG. 1) of the spindle. Also, the disk fabrication process may itself result in the data tracks not being perfectly concentric or perfectly circular. Thus if the disk 104 is rotated with the actuator 110 holding the head 109 at a fixed radial position from the center of rotation 111, the head will typically traverse multiple tracks as the servo sectors 120 pass the head during one disk rotation. This makes it impossible during the servowriting process for the head to magnetize the dots in the servo sectors 120 according to the desired pattern.

In this invention the gross eccentricity or non-circularity of the disk from its center of rotation is first calculated and used to generate a gross feedforward correction or compensation signal so that the servowriter read and write heads generally follow a data track centerline. A special PES alignment pattern is located in each servo sector and is used to generate a fine correction signal to precisely adjust the radial position of the servowriter write head relative to a data track centerline. The PES alignment pattern comprises multiple circumferentially spaced-apart alignment fields. Each alignment field comprises a plurality of circumferential segments that are radially spaced apart, typically by the track width or track pitch (TP). Prior to servowriting the desired pattern, all of the dots in the data sectors and the servo sectors, including the dots in the alignment fields, are first magnetized in the same direction, typically by a DC magnetization process. The read head is then held at a fixed radial position and the disk rotated. Data track crossings are detected as a function of angular position, which represent the gross eccentricity or non-circularity of the tracks on the disk with respect to the center of rotation, and this data is used to generate a gross feedforward correction signal to the actuator so that the read head generally follows a data track centerline. Then, with the read head generally following a data track centerline, as each servo sector passes the read head, the read head will cross the circumferential segments in the PES alignment fields. This results in a readback signal at each servo sector that represents the fractional track-width radial offset of the read head in that servo sector, i.e., the fractional amount of a track-width the read head is radially offset from a data track centerline. The set of radial offsets for all of the servo sectors represents the fine eccentricity or non-circularity of the tracks on the disk with respect to the center of rotation. This data is used to modify or fine tune the gross feedforward control signal that is applied during the servowrite process. This enables the write head to then precisely follow a track centerline (or a track radially shifted from the track centerline by a fraction of TP) so that the dots in the PES fields can be magnetized according to the desired pattern.

Figure 3:
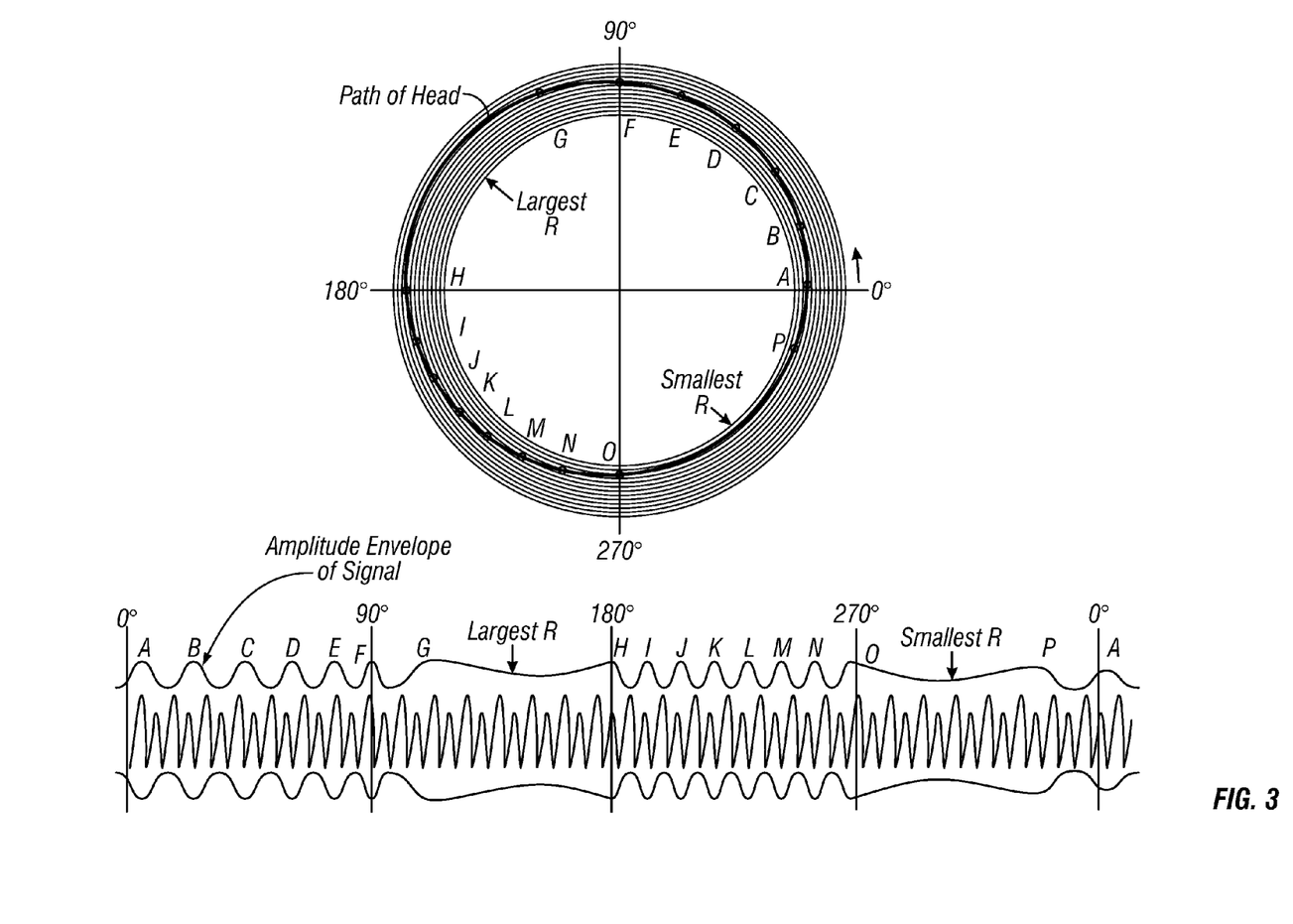
FIG. 3 is an illustration of the gross eccentricity or non-circularity of the data tracks relative to the center of rotation of the spindle and of the method for calculating the gross eccentricity.

To find the gross eccentricity, which will typically be many track-widths in magnitude, the head is maintained at a fixed radius and the amplitude of the readback signal at the frequency of the data dots is measured as the disk rotates. The method is illustrated in FIG. 3. As the disk rotates relative to the fixed head, the head appears to make a path relative to the disk as indicated by the heavy black circle. The finer black circles indicate the centerlines of data tracks containing the data dots. In the example shown, because of eccentricity the head crosses 8 tracks in one disk rotation, where rotation begins at zero degrees, corresponding to an index pulse from the servowriter spindle motor. The track crossings in one direction (as the path of the head is radially outward relative to the disk) are labeled as events P through G, and the track crossings in the other direction (as the path of the head is radially inward relative to the disk) are labeled as events H through O. The readback amplitude of the signal will look like that shown at the bottom of FIG. 3, where the amplitude is maximum when the head is at the track centerlines and minimum when the head is between track centerlines. Also, it can be seen from FIG. 3 that near the largest radial position (between track crossings G and H) and the smallest radial position (between track crossings O and P), the track crossings spread out. The gross peak-to-peak runout or change in radial position, in units of track-width, is equal to half the total track crossings per revolution. The angular positions at the largest and smallest radial positions ("largest R" and "smallest R" in FIG. 3) can also be observed by the symmetry of the track crossings. The largest radial position is at the angular position at the center between peaks G and H, and the smallest radial position is at the angular position at the center between peaks O and P. The largest R can be distinguished from the smallest R by comparing the absolute frequency at the two points. At the largest R, the frequency will be lower than at the smallest R because the actual radius from center of rotation is lower than intended when the head is at the most radially outer track, and higher than intended when the head is at the most radially inner track. Based on the known angular positions of the largest R and smallest R and the number of track crossings observed, the amplitude and phase for gross eccentricity can be calculated and used to generate a gross feedforward correction signal. The signal from the read head (shown at the bottom of FIG. 3) is digitized and passed from the R/W electronics 113 (FIG. 1) to servo electronics 112. The microprocessor in servo electronics 112 (FIG. 1) stores in its associated memory the amplitudes and associated angular positions as a look-up table, which is then accessed to modify the servo control signal to the actuator 110. Alternatively, the microprocessor in servo electronics 112 may take the amplitudes and associated angular positions and execute a curve-fit algorithm to represent the gross eccentricity in the form of an equation. The microprocessor would then use this equation to calculate the radial position correction as a function of angular position, which can be used as the gross feedforward correction signal. With this feedforward correction signal applied, the actuator will cause the read head and write head to generally follow a data track centerline.

Figure 4:
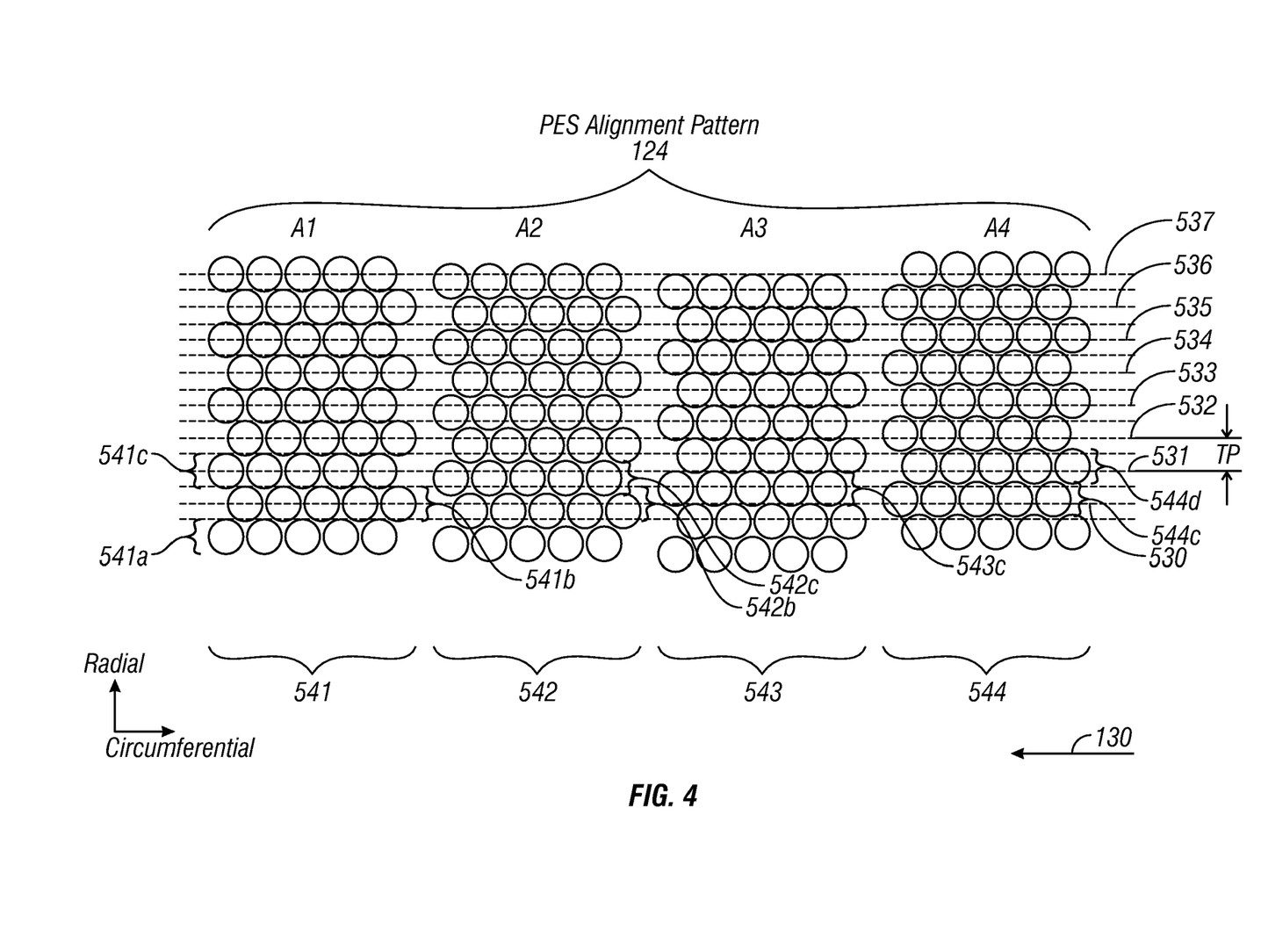
FIG. 4 is a schematic of the PES alignment pattern located in each servo sector for enabling servowriting the dots in the PES field according to the method of this invention.

FIG. 4 is a schematic of the PES alignment pattern 124 that may be located in each servo sector. PES alignment pattern 124 may be located anywhere within servo sector 120, for example between sync field 122 and PES field 123 (FIG. 2). The PES alignment pattern 124 includes circumferentially spaced-apart PES alignment fields A1-A4, represented as alignment fields 541-544. Horizontal lines 530-537 represent the centerlines of the data tracks that are radially spaced apart by track pitch (TP). As shown in FIG. 4, each alignment field, like field A1, comprises an HCP array of magnetizable dots arranged in radially-spaced circumferential rows or segments, as shown by typical segments 541a, 541b and 541c. In FIG. 4, the segments in one of the alignment fields, field A1, are aligned with the track centerlines 530-537. Each alignment field is radially shifted from its circumferentially-adjacent neighbor alignment fields by a fixed fractional portion of TP. In the example of FIG. 4, there are four alignment fields, each of which is radially shifted from its circumferentially-adjacent neighbor alignment field by one-fourth TP. Thus, segment 542c in A2 is radially shifted one-fourth track from segment 541c in A1, segment 543c in A3 is radially shifted one-fourth track from segment 542c in A2, and segment 544c in A4 is radially shifted one-fourth track from segment 543c in A3. Because there are four alignment fields, the shifting then repeats, with segment 541b in A1 being radially shifted one-fourth track from segment 544c in A4. In FIG. 4, all of the dots are illustrated as white dots to represent that they are all magnetized in the same direction, i.e., perpendicularly into the disk or out of the disk. Thus in this invention all of the dots in the servo sectors, including the dots in the PES alignment pattern 124, are first magnetized in the same direction, typically by a DC magnetization process.

As previously described, if the head is maintained at a fixed radial position from the center of rotation of the disk, the head will typically traverse multiple tracks as the servo sectors pass the head during one disk rotation due to eccentricity or non-circularity of the disk relative to the center of rotation. However, in this invention the gross feedforward correction signal, calculated as described above, is used to cause the read head to generally follow a data track centerline. In FIG. 4, the disk is rotating in the direction of arrow 130, so the head is generally following a data track centerline and will now traverse less than one track-width and generally only a fraction of a data track during one revolution of the disk as a result of the fine eccentricity or non-circularity of the tracks. Because the circumferential segments in each PES alignment field are radially shifted one-fourth track from segments in adjacent PES alignment fields, the read head will typically traverse no more than 4 different segments during one revolution of the disk. For example, in FIG. 4 if the head is following track centerline 530 there would be only a residual wandering away from centerline 530 during this one PES alignment pattern. However, during one complete revolution, the head may for example traverse approximately from centerline 530 to centerline 531, during which it crosses segments 541b, 542b, 543c and 544d in different PES alignment fields angularly spaced around the disk. In this invention, the readback signal from the alignment fields is used to calculate a radial offset corresponding to a fractional portion of a track-width. The radial offsets from the PES alignment patterns in all of the servo sectors are then used to modify or fine tune the gross feedforward correction signal to cause the actuator to move the servowriter write head so that it is maintained precisely along data track centerlines and precisely along tracks radially shifted but concentric with the data track centerlines. Thus the dots in the servo sectors can be magnetized in the desired pattern.

Figure 5:
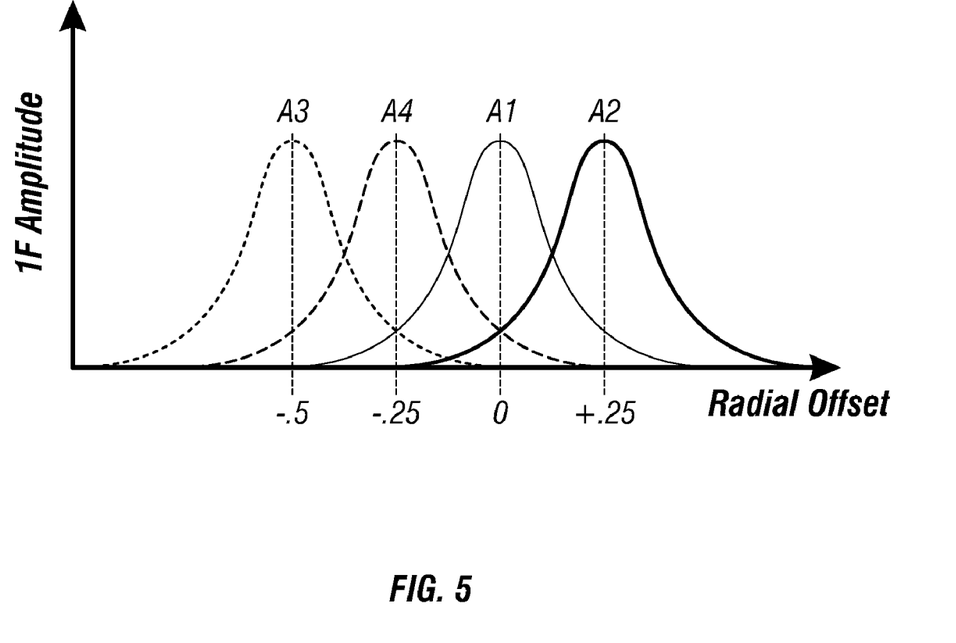
FIG. 5 is an illustration of each of the signal amplitudes at the dot frequency (1F) from four alignment fields (A1-A4) as a function of radial position of the read head.

A feature of the alignment fields is that if the read head were to be maintained precisely at the centers of the dots in any segment, for example along track centerline 530 on which the dots in segment 541b are located, the readback signal will have a frequency F, corresponding to the frequency at which the dots in segment 541b pass the head. However, if the head were to be maintained at a radial location between segments, for example between segments 541b and 541c, then the dots in both segments will pass the head so the readback signal will have a frequency 2F, i.e., twice the dot frequency in a circumferential segment. Thus, for example, if the head were precisely following track centerline 530, the readback signal from alignment field A1 will have a frequency 1F with maximum amplitude, the readback signal from alignment field A3 will have a frequency 2F with maximum amplitude, and the readback signals from alignment fields A2 and A4 will have both 1F and 2F components, but with reduced signal amplitudes. This feature can be used to calculate the radial offset of the read head from a data track centerline in each of the servo sectors in the manner described below, as illustrated with FIG. 5. FIG. 5 is an illustration of each of the 1F signal amplitudes from PES alignment fields A3, A4, A1 and A2 as a function of radial position of the read head. Similarly, if the 2F signal were to be plotted, there would be four similar peaks as in FIG. 5, except they would correspond to fields A1, A2, A3 and A4 respectively. FIG. 5 is shown for the example where zero radial position or offset corresponds to the track centerline, for example the centerline of track 530, where the 1F signal amplitude from alignment field A1 is at its maximum amplitude. Similarly, if the read were precisely aligned halfway between track centerlines 530 and 531 as the servo sector passed the read head, the 1F signal amplitude from field A3 will be at is maximum amplitude, which occurs at a radial offset of −0.5TP. As can be appreciated from FIG. 5, as the read head passes the four alignment fields in a servo sector, there will be four detectable signals at 1F. The 2F signals could be used in a similar manner. The amplitudes of these four signals are used to calculate the fractional portion of a track-width that the read head is radially offset from the data track centerline. Thus the servowriter read channel may include a suitable filter so that only signals near 1F are detected. In other embodiments, 2F signals and 2F filters, or a combination of 1F and 2F signals and their corresponding filters, may be used.

By moving the head radially in small steps across a little more than one track and observing the amplitudes of the signal from the four PES alignment fields in just one of the servo sectors, the four amplitude peaks will be generated as shown in FIG. 5. The calibration of actuator current vs. radial movement of the head can be accomplished by moving the actuator against the disk drive's elastomeric inside diameter (ID) crash stop, slowly reducing the actuator current so that the head moves outward, and observing the amplitudes of the signal from the four PES alignment fields in just one of the servo sectors. A servo sector near the largest R or smallest R (FIG. 3) is the preferred servo sector to perform this calibration because the radial position of the track relative to the head is changing slowly. Over any small range like a track-width, the crash stop's compression will be highly linear, like an ideal spring, and a calibration of actuator current vs. radial position can be obtained by observing when one of the peaks of the A1-A4 signals repeats. Since the track-width is precisely known from the fabrication of the disk, the head radial position is known (for one sector) as a function of actuator current, to a small fraction of a track-width. By recording the amplitudes of signals A1-A4 vs. head position for this one sector under study, the graph of FIG. 5 can be generated. By repeating this calibration for several servo sectors, any noise in the graphs due to fabrication tolerances can be averaged out. This allows for an accurate table of values for the amplitudes of the A1-A4 signals vs. head radial offset relative to a track centerline. Those skilled in the art of PES demodulation will recognize that other algorithms may be applied for generating the position signal from the signals of the amplitude values for A1-A4.

After a table has been generated with the values represented by the graph of FIG. 4, this lookup table can be used to generate a head radial offset relative to a track center line for any servo sector the head is crossing. This is done by capturing the four amplitudes from the four signals A1-A4 and using a least-squares fit to determine what radial offset most precisely matches the amplitudes that were captured. For example, if the A1 and A2 amplitudes are equal, and A3 and A4 amplitudes are very low, then the radial offset is about +0.125. At any radial offset position, one of the four signals should have an amplitude near zero. This amplitude is ignored in the least-squares fit calculation. Of the remaining three amplitudes, the radial offset is chosen by observing which line of the lookup table has values for the three amplitudes such that the sum of the squares of the deviations of the actual amplitudes minus the target values (the values in the table) are a minimum. When this value has been found, the best-fit radial offset is output as the head radial offset with respect to a track centerline.

Using this method, the fine eccentricity of the track, i.e. its eccentricity or non-circularity relative to the track centerline, can now be measured. After the fine eccentricity has been measured, the gross feedforward correction signal is fine-tuned or modified. The generation of the lookup table of radial offset values and corresponding A1-A4 amplitudes, the least-squares calculations, and the generation of the fine eccentricity correction signal to modify the gross feedforward signal is performed in the servo electronics 112 (FIG. 1) in the manner similar to that described above for the calculation of the gross feedforward correction signal. Once the fine correction is applied, the head will precisely follow the track centerlines.

With the servowriter read head precisely following a track centerline, the servowriter write head can now precisely magnetize the dots in the PES field 123 (FIG. 2) with the desired pattern. For example, if the read head is following one of the track centerlines 530-537, the write head may magnetize the dots in burst C and burst D in one of the tracks (depending on the known amount read head-write head offset in the servowriter). Then the write head can be moved radially by precisely one-half TP to allow the write head to magnetize the dots in burst A and burst B. The write head continues to be stepped radially until all of the dots in the PES fields of all of the servo sectors have been magnetized. In the example of FIG. 2 the size of the steps is one-half TP because of the particular servo pattern. However, other smaller steps can be used, thereby allowing the method to be applied to servowrite various kinds of servo patterns.

Figure 6:
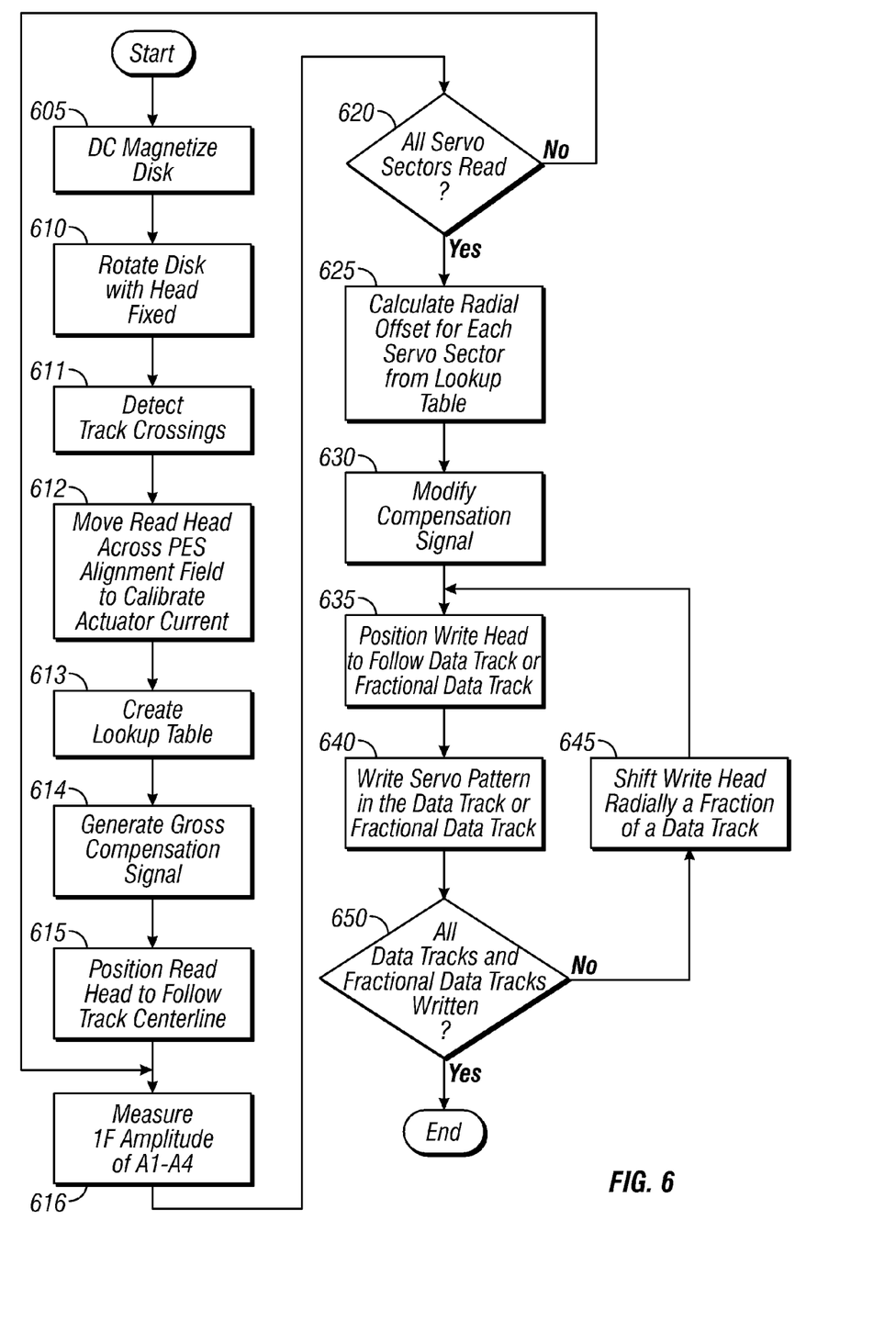
FIG. 6 is a flow chart of the servowriting method according to this invention.

FIG. 6 is a flow chart of the method for servowriting the disk. In block 605, the patterned-media disk is DC magnetized so that all the dots, including the data dots and all the dots in all of the servo sectors, have the same magnetization polarity. Next, the disk is placed on the spindle and rotated with the read head maintained at a fixed radial location (block 610). Track crossings are detected (block 611). The actuator is then moved to the ID crash stop and the read head moved while the 1F amplitudes in the PES alignment field of a sector and corresponding actuator currents are measured, resulting in the calibration of actuator current as a function of fine radial offset (block 612). A lookup table of radial offset values and corresponding A1-A4 amplitudes is generated (block 613). The detected track crossings from block 611 and the lookup table are used to generate a gross feedforward compensation signal (block 614). This allows the read head to generally follow a track centerline (block 615). Next, with the gross feedforward compensation signal applied so the read head generally follows a track centerline, the signal from the PES alignment fields in a servo sector and the amplitudes of the 1F signals from each PES alignment field is measured (block 616). The method continues for each servo sector until all servo sectors have passed the read head (block 620). Then the radial offset for each servo sector is calculated, using the lookup table (block 625). The set of radial offsets is then used to generate a fine feedforward compensation signal to modify the gross feedforward compensation signal to the actuator (block 630). The disk continues to rotate and the write head is then positioned by the actuator, using the modified compensation single, to precisely follow a track centerline (block 635), for example track centerline 530 (FIG. 2). The servo pattern is then written in that data track in all the servo sectors (block 640), for example to write Burst C and Burst D (FIG. 2). After the first data track is written, the write head is radially shifted the desired amount, typically a fraction of a data track width (block 645), for example one-half a data track width (½ TP) to write the servo pattern in that next fractional data track, for example, the half-track between track centerlines 530, 531 to write Burst A and Burst B (FIG. 2). This continues until all tracks and fractional tracks in the servo sectors have been written with the desired pattern (block 650). The steps of reading the alignment fields, calculating the radial offsets and generating the compensation signal (blocks 613-630) can be performed one or more times at different radial locations on the disk, for example at one radial location at the middle of each annular band or zone, like zones 151-153 in FIG. 1.

The invention has been described with a separate PES alignment pattern 124 (FIG. 4) in each servo sector, where the alignment pattern 124 is different from the pattern of the PES field 123 (FIG. 2). However, it is within the scope of the invention that the PES alignment pattern can also function as the PES field, so that after the PES alignment fields have been read to generate the lookup table for calculating the fine feedforward correction signal, the write head then writes the desired servo pattern by magnetizing the dots in the PES alignment fields according to the desired pattern. In this case, the write head is stepped in increments of one-fourth TP to overwrite the dots in the PES alignment fields with the desired servo pattern. Also, while the invention has been described with four alignment fields, with each alignment field shifted by one-fourth TP, it is understood to one skilled in the art that more or fewer alignment fields may be used and that the alignment fields may be shifted by fractional portions of TP other than one-fourth TP.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for writing servo information on a perpendicular magnetic recording disk with a system that includes a processor, a spindle for rotating the disk, a read head and a write head, and an actuator responsive to a control signal for moving the read head and write head across the disk, the disk having a plurality of generally concentric circular data tracks radially spaced by a track pitch (TP) and containing discrete magnetizable data dots, and a plurality of servo sectors extending generally radially across a plurality of the data tracks and containing discrete magnetizable dots, each of the plurality of servo sectors including a position error signal (PES) alignment pattern of a plurality of circumferentially-spaced alignment fields, each alignment field comprising discrete magnetizable dots forming a pattern of dots extending generally radially across the tracks, the dots in each alignment field being arranged in circumferential segments, each segment being radially spaced from adjacent circumferential segments, wherein each alignment field is radially shifted from circumferentially adjacent alignment fields by a fixed fractional portion of TP, the method comprising:
    magnetizing all of the dots in all of the alignment fields of the PES alignment pattern in the same perpendicular direction;
    rotating the disk while the read head generally follows a data track centerline;
    detecting with the read head a readback signal from the alignment fields in the servo sectors as the disk rotates;
    calculating, from the readback signal from the alignment fields in each servo sector, a radial offset of the read head relative to a data track centerline for each servo sector;
    using the calculated offsets to adjust the radial position of the write head to cause the write head to follow a data track centerline while the disk is rotating;
    while the write head is following a data track centerline, magnetizing dots in the servo sectors according to a predetermined pattern;
    moving the write head radially a fractional part of TP;
    causing the write head to follow a track that is radially shifted from a data track centerline by said fractional part of TP; and
    while the write head is following said radially shifted track, magnetizing dots in the servo sectors according to a predetermined pattern.

2. The method of claim 1 further comprising:
    rotating the disk while the read head is maintained at a fixed radial position;
    detecting track crossings by the read head; and
    generating from the detected track crossings a gross feedforward compensation signal to the actuator to thereby cause the read head to generally follow a data track centerline.

3. The method of claim 1 further comprising creating a lookup table of radial offsets and corresponding signal amplitudes, and wherein calculating a radial offset for each servo sector comprises using the amplitudes from the readback signal from the alignment fields to determine the radial offset from said lookup table.

4. The method of claim 1 wherein magnetizing dots in the servo sectors according to a predetermined pattern comprises magnetizing dots in the PES alignment fields to thereby servowrite a PES pattern of PES fields in the servo sectors 5. The method of claim 1 wherein there are four alignment fields and wherein each alignment field is radially shifted from circumferentially adjacent alignment fields by one-fourth TP.

6. The method of claim 1 wherein the circumferential segments in one of the alignment fields are aligned with the data tracks.

7. The method of claim 1 wherein the pattern of dots in each alignment field is a hexagonal-close-packed (HCP) pattern.

8. The method of claim 1 wherein the magnetized dots in the circumferential segments pass the read head at a frequency F during rotation of the disk, and wherein detecting a readback signal from the alignment fields comprises detecting the amplitude of a readback signal at a frequency of approximately F.

9. The method of claim 6 wherein calculating the radial offset of the read head at a servo sector comprises calculating the radial offset from the amplitude of the readback signal at a frequency of approximately F from each of the alignment fields in the servo sector.

10. The method of claim 1 wherein the data tracks are grouped into annular zones and further comprising, after magnetizing all the dots, performing the remaining steps of the method of claim 1 for each zone.

11. The method of claim 1 wherein the system is a disk drive.

12. The method of claim 1 wherein the system is a dedicated servowriter.

13. A patterned-media perpendicular magnetic recording disk comprising:
    a plurality of generally concentric circular data tracks radially spaced by a track pitch (TP) and containing discrete magnetizable data dots;
    a plurality of servo sectors extending generally radially across a plurality of the data tracks and containing discrete dots, each of the plurality of servo sectors including a synchronization field, a position error signal (PES) field, and a PES alignment pattern of a plurality of circumferentially-spaced alignment fields; and
    wherein each alignment field comprises discrete dots all magnetized in the same direction and forming a pattern of dots extending generally radially across the tracks, the dots in each alignment field being arranged in circumferential segments, each segment being radially spaced from adjacent circumferential segments, and each alignment field being radially shifted from circumferentially adjacent alignment fields by a fixed fractional portion of TP.

14. The disk of claim 13 wherein the discrete dots in the PES field are magnetized in a predetermined pattern.

15. The disk of claim 13 wherein there are four alignment fields and wherein each alignment field is radially shifted from circumferentially adjacent alignment fields by one-fourth TP.

16. The disk of claim 13 wherein the circumferential segments in one of the alignment fields are aligned with the data tracks.

17. The disk of claim 13 wherein the pattern of dots in each alignment field is a hexagonal-close-packed (HCP) pattern.

18. The disk of claim 13 wherein the data tracks are grouped into annular zones.

* * * * *